Dec. 31, 1968          E. GORDY                    3,419,806
                      DENSITOMETER
                    Filed Aug. 13, 1964
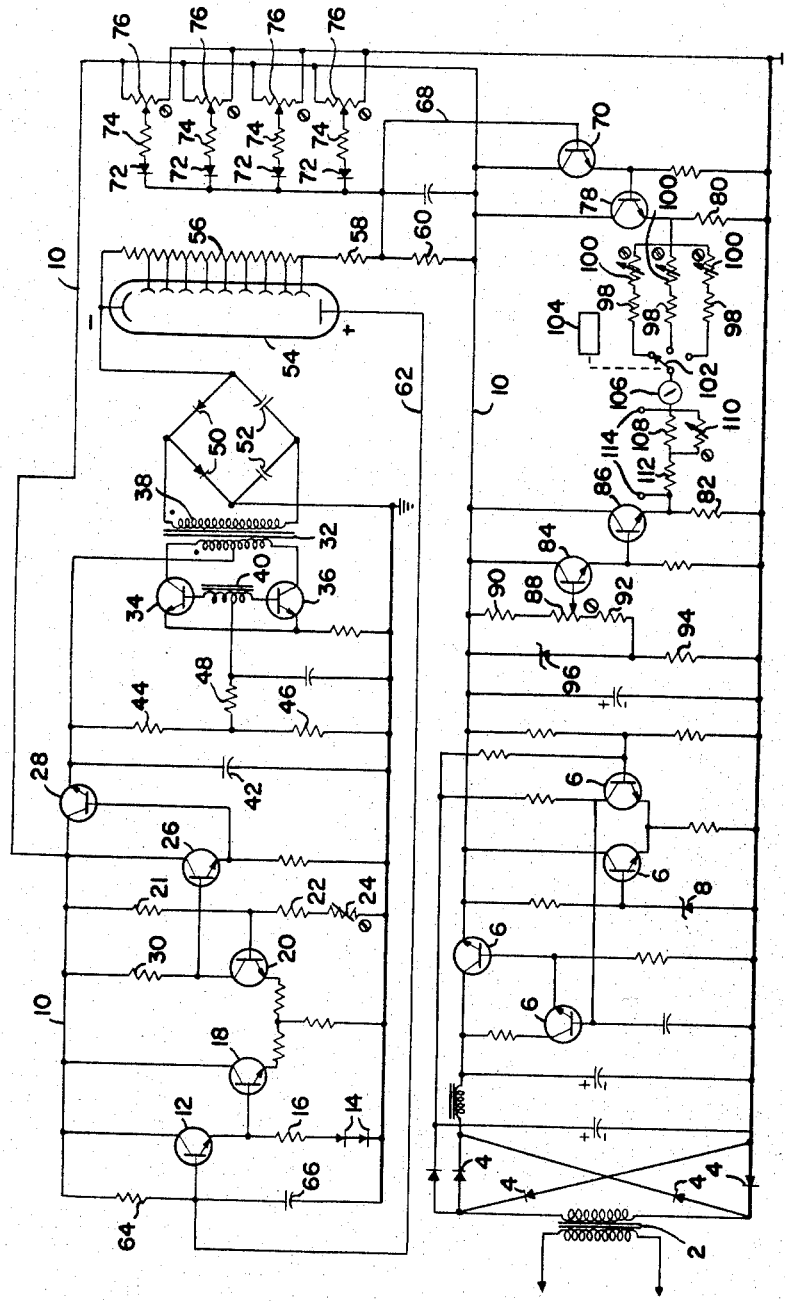
INVENTOR.
EDWIN GORDY
BY
ATTORNEYS

United States Patent Office 3,419,806
Patented Dec. 31, 1968

3,419,806
DENSITOMETER
Edwin Gordy, 39 Woodgate Road,
Tonawanda, N.Y. 14151
Filed Aug. 13, 1964, Ser. No. 389,302
3 Claims. (Cl. 328—2)

ABSTRACT OF THE DISCLOSURE

A densitometer comprises a photomultiplier tube, receiving power from a transistor oscillator, which is controlled by a circuit responsive to the photomultiplier anode current. The output is taken from the dynode circuit, and is logarithmically related to incident light intensity. A linearizing circuit comprising a plurality of biased diodes operates on the photomultiplier output.

---

This invention relates to densitometers, and particularly to circuits employing photomultiplier tubes which provide an output response which is a logarithmic function of the input.

In colorimetry and in spectrophotometry, it is well known that, for a given wavelength of light incident on an absorbing medium, the ratio of the intensities of the incident and transmitted light is an exponential function of the product of the concentration of the absorbing substance and the depth of the absorbing medium. Therefore, in a circuit which is to give a direct reading either of the concentration of absorbing substance or the depth of the absorbing medium, it is desirable to provide a response which is a logarithmic function of the ratio of incident to transmitted light intensities. Concentrations or depths varying over a great range may then be measured without the use of range changing switches or the like. An additional advantage of this type of circuit is that the danger of damage caused by overdriving a recording device is virtually eliminated.

In the field of photographic film sensitometry, it has been the practice to indicate film characteristics graphically by plotting film blackening against film exposure. In order to cover the large range of exposures and blackening on a single graph, logarithmic compression is employed. Exposure time is plotted on a logarithmic scale and film blackening is expressed as the ordinary logarithm of the ratio of incident to transmitted light intensities. This is the definition of "density." In sensitometery, it is therefore desirable that the device used for measuring this ratio have a logarithmic response.

In colorimetry and in film sensitometry, it is desirable to utilize photomultiplier tubes because of their extremely high sensitivity. United States Patent 2,478,163, issued Aug. 2, 1949, discloses a logarithmic photometer utilizing a photomultiplier tube.

Photomultipliers are inherently unstable and cannot be used in measuring circuits in which this instability is detrimental.

It is therefore an object of this invention to provide a measuring circuit utilizing a photomultiplier tube under conditions in which the instability of the tube is not detrimental.

A further object of this invention is to provide a densitometer capable of measuring optical densities varying through a wide range.

A further object of this invention is to provide a densitometer whose sensitivity may be adjusted in a simple manner.

Photomultiplier tubes operate most efficiently at voltages which are so high that they virtually prohibit the use of transistors, which ordinarily operate at comparatively low voltages, in accompanying circuitry. Consequently, it is still a further object of this invention to provide a measuring circuit in which a photomultiplier tube and associated transistors are compatible.

These and other objects of this invention will become apparent from the following description read in conjunction with the accompanying drawing in which the single figure is a schematic diagram showing the electrical circuitry in accordance with the present invention.

A conventional, regulated direct current power supply comprising transformer 2, diodes 4, transistors 6 and Zener diode 8, is provided to deliver low voltage direct current to bus 10 for the operation of the various circuit components to be described.

An n-p-n silicon transistor 12, chosen because of its low collector leakage current value, is provided in an emitter-follower configuration. A pair of diodes 14 and resistor 16 are provided between the emitter of transistor 12 and the ground. The output of the emitter-follower is fed to the base of a transistor 18, which, with transistor 20, constitutes a high-gain difference amplifier. A potentiometer 24 is provided, in series with a resistor 22, between the base of transistor 20 and ground.

The output of the difference amplifier, appearing at the collector of transistor 20, is fed to the base of transistor 26, which is incorporated as a first emitter-follower in a pair of cascaded emitter-followers including transistors 26 and 28.

Direct current supply bus 10 is connected directly to the collectors of transistors 12, 18, 26 and 28 and through resistor 30 to the collector of transistor 20. The output of the emitter-follower comprising transistor 28 is delivered directly to the center tap connection on the primary of transformer 32. A push-pull oscillator comprising transistors 34 and 36 is provided to deliver an output through transformer 32 to secondary winding 38 having many more turns than the primary winding. An additional secondary winding 40 of transformer 32, having a relatively small number of turns, provides feedback in the push-pull oscillator. A by-pass capacitor 42 is connected between the emitter of transistor 28 and ground and series resistors 44 and 46 in conjunction with resistor 48 provide direct current for the bases of transistors 34 and 36 through the center tap of winding 40 of transformer 32. This transformer is preferably of the ferrite pot core type usable at frequencies in the high audio range.

A rectifying and filtering network comprising diodes 50 and capacitors 52 is provided to convert the output of transformer 32 to direct current for the operation of photomultiplier tube 54. It can be seen here that the D.C. voltage supplied to the cathode of the photomultiplier is directly responsive to the output of the push-pull oscillator, which, in turn, is dependent on the D.C. voltage delivered through the emitter-followers comprising transistors 26 and 28.

A resistance string 56 is provided to deliver a different voltage to each of the dynodes in the photomultiplier tube so that each dynode toward the anode is more positive than its adjacent dynode toward the cathode. Dynode string 56 is supplied by the output of the rectifier comprising diodes 50, and its positive end is connected to line 10 through resistors 58 and 60. The anode of photomultiplier 54 is connected directly to the base of transistor 12 through line 62. The base of transistor 12 is connected to the D.C. supply bus 10 through resistor 64. Capacitor 66 by-passes the base of transistor 12 to ground.

An attenuated sample of the voltage appearing at the cathode of photomultiplier tube 54 is fed through line 68 to the base of transistor 70. A linearizing network, comprising diodes 72, resistors 74 and potentiometers 76, is provided to act on the signal appearing in line 68. The combination of transistors 70 and 78 constitutes a cascaded emitter-follower whose output voltage appears across resistor 80.

A reference voltage is supplied across resistor 82 by a similar cascaded emitter-follower comprising transistors 84 and 86. An adjustable potentiometer 88 is provided in the base circuit of transistor 84. One end of the resistance element of potentiometer 88 is connected to the power supply bus 10 through resistor 90. Its other end is connected to ground through resistors 92 and 94. A Zener diode 96 is provided between power supply bus 10 and the junction of resistors 92 and 94.

A range changing network comprising resistors 98 and potentiometers 100 is connected at one end to the emitter of transistor 78. Switch 102 and associated range indicator 104 are provided in connection with the range changing network. The movable member of switch 102 is connected to one terminal of a microammeter 106. The other terminal of microammeter 106 is connected through the parallel combination of resistor 108 and potentiometer 110 and through resistor 112 to the emitter of transistor 86. Terminals 114 are provided for the connection of external voltage responsive recorders such as chart recorders.

The operation of the circuit described above will become clear from a consideration of the function of each of the basic circuits constituting the combination.

Considering first the amplification characteristics of photomultiplier tubes, it will be noted that, in a photomultiplier, for a given set of dynode potentials and at a constant anode-to-cathode voltage, anode current varies substantially linearly with incident light intensity. On the other hand, for a given light intensity, the anode current varies as the exponential of dynode voltage. With both dynode voltage and incident light flux varying, anode current can be characterized by the following equation:

$$i = ae^{cV} \cdot I$$

where $i$ is photomultiplier anode current,
$e$ is the base of natural logarithms,
$c$ is a constant for a particular photomultiplier,
$V$ is the dynode supply voltage,
$I$ is incident light intensity, and $a$ is a constant of proportionality.

This indicates that if anode current can be maintained substantially constant in the photomultiplier tube, the desired logarithmic relationship between incident light intensity and an output signal might be obtained by employing a method to vary the amplification of the photomultiplier tube. The above mentioned output signal could then be obtained from the dynode voltage.

The amplification of the photomultiplier tube 54 depends on the voltage applied to the voltage dropping dynode resistance string 56 through the rectifier comprising diodes 50.

With regard to the method of controlling the amplification of the photomultiplier, the photomultiplier current in line 62 is fed back and made to control the emitter-follower comprising transistor 12. This emitter-follower delivers one input to the difference amplifier comprising transistors 18 and 20, through the base of transistor 18. The second input to the difference amplifier is a constant reference voltage obtained through dividing resistors 21 and 22 and potentiometer 24. This reference is applied to the base of transistor 20.

The output of the difference amplifier is taken from the collector of transistor 20 and drives the cascaded pair of emitter-followers comprising transistors 26 and 28.

This amplified D.C. signal which represents the difference between the photomultiplier anode current and a reference level is used to power the push-pull oscillator and variations in the amplitude of this signal cause corresponding variations in the amplitude of the oscillatory output delivered through transformer 32 to the rectifying network. Thus, if the reference level is made higher than the highest expected anode current, as the photomultiplier anode current increases, the oscillation amplitude decreases.

The secondary winding 38 of transformer 32 has many more turns than the primary winding. Consequently, the high voltage necessary for the operation of the photomultiplier tube is obtained from the oscillator output.

It can be seen that, if an increase in current occurs through the photomultiplier, the output of the difference amplifier is decreased and, consequently, the D.C. voltage applied to the oscillator is decreased. Such a decrease in D.C. voltage causes the output of the oscillator to decrease, and this, in turn, decreases the dynode potentials which determine the sensitivity of the photomultiplier. This decreases the anode current of the photomultiplier.

It will be apparent that, if the transresistance of the amplifier comprising transistors 12, 18, 20, 26 and 28 is sufficiently high, the anode current will tend to remain constant and different light intensities will be indicated by varying dynode potentials. Considering the characteristics of photomultiplier tubes, it will also be apparent that the dynode voltage will vary approximately with the logarithm of the reciprocal of incident light intensity.

From examining the characteristics of photomultiplier tubes, it can be concluded generally that the logarithm of sensitivity in amperes/lumen is related almost directly to dynode potential. In the circuit described above, anode current in the photomultiplier is maintained substantially constant and the logarithm of the reciprocal of light intensity is determined by the dynode voltage.

In practice, however, photomultiplier characteristics vary somewhat from true logarithmic form. In the circuit of this invention, the voltage $V$ appearing across terminals 114 can be quite accurately characterized by the expression:

$$V = K(\ln I_0/I)^x$$

where $K$ is a constant multiplier,
$I_0$ is the intensity of light from the light source,
$I$ is intensity of light incident on the photomultiplier, and $x$ is an exponent greater than one, which expresses the variation of the relationship from true logarithmic form.

The biased diode network comprising diode 72, resistors 74 and potentiometers 76, when properly adjusted, permits adjustment of the exponent $x$ in the above equation to equal one, so that the indicator voltage is accurately proportional to the logarithm of the reciprocal of incident light intensity. This biased diode network is a conventional linearizing network. Its operation involves the successive switching of added resistance in parallel with resistor 60 as the voltage across resistor 60 becomes more negative. Thus, with proper adjustment of potentiometers 76, the voltage across resistor 60 can be made more accurately representative of $\ln I_0/I$. It will be apparent that more accurate linearization can be obtained by employing additional biased diodes in the linearizing network. In this application, however, four diodes have been found to be satisfactory.

The voltage appearing across resistor 60 is fed through a pair of cascaded emitter-followers comprising transistors 70 and 78 and is compared with a reference voltage appearing at the emitter of transistor 86. The difference is indicated either by meter 106 or by an external indicator connected to terminals 114.

When used as a four-decade logarithmic photometer, this circuit gives an output indication of optical density ranging from zero to four. This is equivalent to covering a range of 1 to $10^4$ in illumination intensity. Under these conditions no range switch is necessary in conjunction with the output indicator. Range switch 102 is included to provide full scale indication of optical density when the instrument is used to monitor the density of very dilute solutions, e.g. the effluent of a chromatographic column.

When this instrument is used to measure concentration in a sample whose concentration varies continuously, a chart recorder can be connected to terminals 114. Since the recorded optical density is directly proportional to the concentration of solute in the sample, direct measurements of concentration can be made from the recorder chart.

Various adjustments are incorporated in the circuit. Potentiometer 24 is provided to compensate for variations in photomultiplier dark current. Potentiometer 88 is a meter zeroing adjustment. Potentiometers 100 and 110 are provided for calibration purposes.

The stability of the circuit described above is dependent on power supply stability and on the elimination of drift, mostly thermal in origin. For this reason, the transistors used in this circuit are all of the planar, epitaxial passivated silicon type having low collector leakage current figures. It will be apparent that germanium transistors can be used in place of the silicon transistors. However, this would necessitate the use of additional means for compensating for thermal drift.

It will be evident that various other modifications can be made to the present invention and accordingly, it is not desired to be limited except as required by the following claims.

What is claimed is:

1. The combination comprising a photomultiplier, means supplying D.C. voltage for the operation of said photomultiplier and for varying the sensitivity thereof, said means supplying D.C. voltage comprising a transistor oscillator having input terminals for receiving direct current supplying the collector-emitter circuit of said oscillator and output terminals for delivering the alternating output of said oscillator, a rectifier receiving said alternating output from said output terminals, means delivering the output of said rectifier to the cathode and dynodes of said photomultiplier, means producing a fixed reference current, direct current amplifying means receiving said reference current and the anode current of said photomultiplier and producing an output varying with the difference between said reference current and said anode current and means delivering the output of said amplifying means to said input terminals of said transistor oscillator, and indicating means responsive to the level of said D.C. voltage for the operation of said photomultiplier.

2. The combination according to claim 1 in which said direct current amplifying means includes a difference amplifier receiving said reference current and said anode current and producing an output corresponding to their difference, and a second direct current amplifier receiving the output of said difference amplifier and providing the said output of said amplifying means.

3. The combination comprising a photomultiplier tube, means supplying direct current voltage to the dynodes of said photomultiplier tube, means providing a sample voltage representing the direct current voltage supplied to said dynodes, and switching means comprising a plurality of biased diodes responsive to the level of said sample voltage, said switching means switching additional resistance in parallel with said sample voltage providing means, and said direct current supplying means comprising a rectifier, an oscillator providing an alternating input to said rectifier, and a direct current amplifier responsive to the current in said photomultiplier tube and providing an output modulating the amplitude of the output of said oscillator and indicating means responsive to the level of said sample voltage.

References Cited

UNITED STATES PATENTS

| | | | |
|---|---|---|---|
| 2,971,433 | 2/1961 | Akin | 88—23 |
| 3,076,896 | 2/1963 | Smith | 250—207 |
| 3,305,756 | 2/1967 | Doss et al. | 321—2 |
| 3,327,199 | 6/1967 | Gardner et al. | 321—2 |

ARTHUR GAUSS, *Primary Examiner.*

J. D. FREW, *Assistant Examiner.*

U.S. Cl. X.R.

328—243